United States Patent [19]

Wentz

[11] Patent Number: 4,515,441
[45] Date of Patent: May 7, 1985

[54] DIELECTRIC POLARIZER FOR HIGH AVERAGE AND HIGH PEAK POWER OPERATION

[75] Inventor: John L. Wentz, Ellicott City, Md.

[73] Assignee: Westinghouse Electric Corp., Pittsburgh, Pa.

[21] Appl. No.: 434,191

[22] Filed: Oct. 13, 1982

[51] Int. Cl.³ .............................................. G02B 5/30
[52] U.S. Cl. ..................................... 350/395; 350/164
[58] Field of Search .................... 350/395, 164, 1.6; 372/106

[56] References Cited

U.S. PATENT DOCUMENTS 4,179,190 12/1979 Friedman et al. ................... 350/394
4,229,066 10/1980 Rancourt et al. ..................... 350/1.6
4,461,532 7/1984 Sato et al. ............................. 350/1.6

Primary Examiner—John K. Corbin
Assistant Examiner—Lynn Vandenburgh Kent
Attorney, Agent, or Firm—W. G. Sutcliff

[57] ABSTRACT

A dielectric optical polarizer which is operable at high peak and average power, with greater than 95 percent transmission of the desired P polarized radiation, and also greater than 95 percent reflectance of the S polarized radiation. The polarizer comprises a radiation transmissive substrate with a first dielectric layer disposed on at least one side of the substrate. The first dielectric layer has an index of refraction higher than the substrate. A second dielectric layer of low index of refraction material is disposed atop the first dielectric layer. A third dielectric layer of the same high index of refraction material as the first layer, is disposed atop the second layer. Each of the dielectric layers is one quarter wavelength thick at the operating wavelength. The dielectric polarizer operates at a very high Brewster angle associated with the dielectric layers rather than that of the substrate.

6 Claims, 2 Drawing Figures

DIELECTRIC POLARIZER FOR HIGH AVERAGE AND HIGH PEAK POWER OPERATION

The U.S. Government has rights in the present invention as a result of work performed under Air Force Contract No. F33615-80-C-1055.

BACKGROUND OF THE INVENTION

The present invention relates to optical polarizers, and more particularly polarizers which operate at a high peak and average power. Many electro-optical systems require polarization of incident radiation to permit further processing of the transmitted polarized optical radiation.

Prior art optical polarizers have utilized a wire grid disposed on a transmissive substrate for separating the two orthogonal components of the unpolarized input radiation. Other optical polarizers utilize birefringent crystalline materials or multiple dielectric coatings on transmissive substrates to obtain efficient polarizer operation. The Brewster angle of the polarizer is the angle of maximum polarization with respect to incident radiation, and is defined by the equation $\tan i = n$, wherein $i$ is the angle of incidence, and $n$ is the index of refraction of the material. Techniques for polarizing input or incident radiation rely for the most part on Brewster's angle operation to separate unpolarized optical radiation into two orthogonal components. The component of polarized transmitted radiation which is parallel to the plane of incidence is termed the P polarization and is transmitted at Brewster's angle. The orthogonal S component of polarization is that which is linearly polarized perpendicular to the plane of incidence and is the reflected polarization at Brewster's angle.

Prior art polarizers which utilize dielectric coatings are known to be far superior to birefringent crystalline polarizers with regard to average power handling capability as a result of a lower radiation absorption characteristic and by virtue of the absence of thermo-optic distortion. Multi-layered dielectric optical polarizers are illustrated in U.S. Pat. No. 3,704,934, which teaches a multi-layered dielectric coating between two prisms of a beam splitter to assure high reflectance for the S polarization component and high transmittance for the P polarization component. The teaching is to utilize about 15 layers of quarter wavelength thick alternating layers of high index of refraction material and low index of refraction material such as cerium oxide and magnesium fluoride. In another prior art dielectric polarizer as seen in U.S. Pat. No. 4,009,933, the dielectric coating is composed of alternate quarter wavelength thick layers of two dielectric materials such as zinc sulfide and thorium fluoride which have significantly different indices of refraction. The teaching is for the dielectric coating to have a sufficient number of layers to reflect most of the light before transmission. This is a reflectivity design which is 99% effective for polarization perpendicular to a grating which is disposed on a substrate over which the dielectric layers are disposed and which is 92% reflective for parallel polarization.

With the development of high power laser systems the need has arisen for dielectric polarizers capable of handling high average and high peak power laser radiation. The prior art dielectric polarizer designs which have utilized multi-layer coatings of, for example, 15 to 30 layers serve to enhance the polarization characteristics of the substrate material which is typically fused quartz or fused silica. The fused quartz substrate material is typically used because of its high optical damage threshold and low absorption at visible and near infrared wavelengths. For laser systems which exhibit both a high peak power density and a high average power density, the prior art dielectric polarizers have been found to be consistently damaged during such operation. By high peak power density, we are referring to power levels in excess of 100 megawatts per square centimeter, and for high average power density referring to in excess of 100 watts per square centimeter. It is believed that such multi-layer dielectric polarizers are damaged due to localize heating in the multiple layers due to multiphoton absorption.

SUMMARY OF THE INVENTION

An optical polarizer is disclosed which operates at high peak and high average power operation with a high Brewster angle for incident radiation to permit such operation without damage to the polarizer. The optical polarizer exhibits an efficiency of transmission of the polarized radiation at greater than about 95%, with the efficiency of reflection for the oppositely or orthogonally polarized radiation also being greater than about 95%. The optical polarizer comprises an optically transmissive substrate having a predetermined index of refraction, and has a plurality of quarter wavelength thick optically transmissive dielectric parallel layers disposed on at least one side of the substrate. A first dielectric layer is disposed on the substrate and has a high index of refraction relative to the substrate. A second dielectric layer is disposed atop the first layer and has a relatively low index of refraction relative to the index of the first dielectric layer. A third dielectric layer is disposed atop the second layer and comprises the same dielectric material as the first layer.

The preferred optical polarizer of the present invention utilize a fused quartz substrate with three dielectric layers disposed on each side of this optically transmissive fused quartz substrate. The first and third dielectric layers disposed upon the substrate comprising zinc sulfide, and the second dielectric layer sandwiched between the first and third dielectric layer comprises magnesium fluoride. The three dielectric layers are each one quarter wavelength thick.

DETAILED DESCRIPTION OF THE INVENTION

Figure 1:
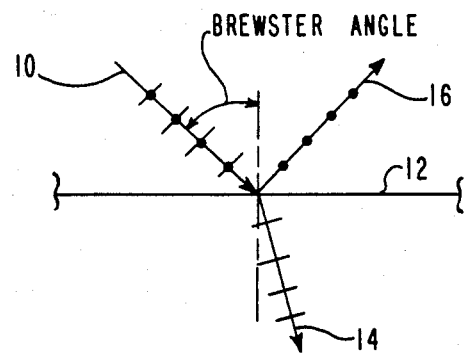
FIG. 1 is a schematic representation which illustrates polarization at the Brewster angle for incident radiation.

FIG. 1 illustrates how unpolarized incident radiation represented by ray 10 is separated by polarization means 12 into a P polarized beam 14, which is linearly polarized parallel to the plane of incidence and is transmitted at Brewster's angle, and an S polarized beam 16 which is linearly polarized perpendicular to the plane of incidence and is the reflected polarization at Brewster's angle. This illustration presupposes that the mediums on either side of the polarization means 12 have differing indices of refraction.

Figure 2:
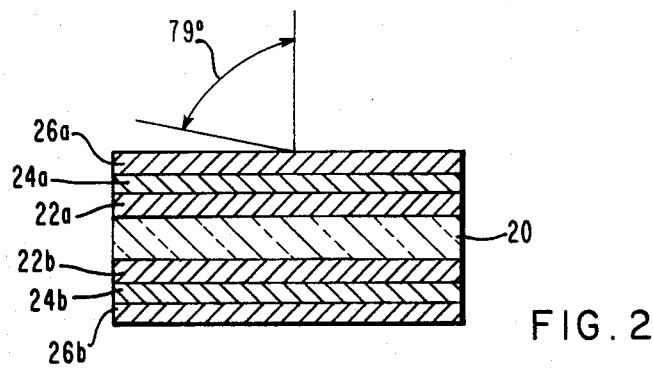
FIG. 2 is a side elevational view in section of an optical polarizaer of the present invention.

The dielectric polarizer 18 of the present invention is illustrated in detail in FIG. 2. The dielectric optical polarizer 18 comprises a fused quartz substrate 20, which efficiently transmits the incident radiation which is utilized. By way of example the fused quartz substrate is about 0.5 mm. thick and the radiation may be infrared radiation such as the 1.06 micrometer radiation output from a neodymium doped YAG laser. A first dielectric layer 22a and 22b is disposed on each side of the quartz substrate 20. A second dielectric layer 24a, 24b is disposed respectively upon the first dielectric layers 22a and 22b. A third dielectric layer 26a, 26b is then disposed respectively atop the second dielectric layers 24a, 24b. Each of the dielectric layers 22a through 26a and 22b through 26b are approximately a quarter wavelength thick at the input radiation wavelength and incident angle. The fused quartz substrate 20 has an index of refraction of approximately 1.45 at 1.06 micrometer wavelength. The first dielectric layers 22a and 22b are formed of relatively high index of refraction material, such as zinc sulfide, which has an index of refraction of approximately 2.3 at 1.06 micrometer wavelength. The second dielectric layers 24a and 24b are formed of relatively low index of refraction material such as magnesium fluoride which has an index of refraction of approximately 1.38 at 1.06 micrometer wavelength. The third dielectric layers 26a and 26b are again formed of high index of refraction material such as zinc sulfide which matches that of the first dielectric layer and has an index of refraction of approximately 2.3 at 1.06 micrometer wavelength. The provision of a high index of refraction dielectric layer determines that the polarizer will have a high Brewster angle of operation. For the embodiment specifically described above, the Brewster angle is 79° which is at a high grazing angle of incidence, which would not normally be expected to be utilized where efficient transmission of polarized energy is desired. However, for this embodiment, the desired transmitted P polarized radiation is better than 95 percent efficient and the efficiency of reflection of the S polarized radiation is also greater than 95 percent.

The dielectric polarizer of the present invention thus utilizes a high Brewster angle for the incident radiation, and the power density incident on the polarizer is thus approximately 3 times less than that incident on prior art dielectric polarizers which utilize a low angle of incidence. That low angle is approximately 55 degrees for commercially available dielectric polarizers which use fused quartz substrates. The large Brewster angle of the polarizer of the present invention results in reduced incident power density by virtue of the greatly increased spot size of the incident beam.

The dielectric polarizer of the present invention thus utilizes a significantly larger polarizing angle, i.e., a Brewster angle of greater than 75°, and a significantly fewer number of dielectric layers than the prior art designs. The specific embodiment of the present invention utilizing only three dielectric layers compared to the 15 to 30 layers for prior art designs.

Other dielectric materials such as titanium dioxide and silicon dioxide can be substituted for the respective high index of refraction first and third dielectric layers and the low index of refraction second dielectric layer. The fused quartz substrate can also be substituted for with other radiation transmissive materials that are undamaged by the high power operation.

It should be emphasized that the present invention dielectric polarizer operates at the Brewster angle of the high refractive index dielectric layer rather than the Brewster angle associated with the substrate. The prior art multi-layer dielectric polarizers continued to make use of the Brewster angle associated with the substrate and thus used a low angle of incidence.

In the embodiment seen of FIG. 2, the plurality of dielectric layers is shown disposed on both sides of the substrate, which is the embodiment as tested for application as a four port polarizer. It should be understood that a dielectric polarizer per the present invention need only have the dielectric layers on one side of the substrate. An anti-reflective means may then be provided on the opposed side of the substrate for efficient transmission of P polarized radiation from the substrate to the adjacent medium.

What is claimed is:

1. An optical polarizer which operates at high peak and average power density operation, with a high Brewster angle of greater than 75 degrees for incident radiation to permit such operation without damage to the polarizer, with the efficiency of transmission of the polarized radiation being greater than about 95%, and the efficiency of reflection for the orthogonally polarized radiation being greater than about 95%, which polarizer comprises;
   an optically transmissive substrate having a predetermined index of refraction,
   a plurality of quarter wavelength thick optically transmissive dielectric parallel layers disposed on at least one side of the substrate, with a first dielectric layer disposed on the substrate and having a high index of refraction relative to the substrate, with a second dielectric layer atop the first layer and having a relatively low index of refraction relative to the index of the first dielectric layer, and a third dielectric layer atop the second layer which third comprises the same dielectric material as the first layer.

2. The optical polarizer set forth in claim 1, wherein the optically transmissive substrate is fused quartz.

3. The optically polarizer set forth in claim 1, wherein the three dielectric layers are disposed on each side of the optically transmissive substrate.

4. The optical polarizer set forth in claim 1, wherein the first and third dielectric layers comprise zinc sulfide.

5. The optical polarizer set forth in claim 1, wherein the second dielectric layer comprises magnesium fluoride.

6. An optical polarizer which operates at a high Brewster angle of greater than 75 degrees for incident radiation to permit reduced incident power density for both peak and average power operation, with the efficiency for the transmitted polarized radiation being greater than about 95 percent, and the efficiency of reflection for the polarized reflected radiation being greater than about 95 percent, which polarizer comprises;
   a. an optically transmissive fused quartz substrate,
   b. a first dielectric quarter wavelength layer of zinc sulfide disposed on both sides of the substrate,
   c. a second dielectric quarter wavelength layer of magnesium fluoride disposed on the first dielectric layers, and
   d. a third dielectric quarter wavelength layer of zinc sulfide disposed on the second dielectric layers.

* * * * *